(12) United States Patent
Zhang et al.

(10) Patent No.: US 9,160,583 B2
(45) Date of Patent: *Oct. 13, 2015

(54) METHOD AND EQUIPMENT FOR CONTROLLING RADIO-FREQUENCY SIGNAL

(71) Applicant: Comba Telecom Systems (China) Ltd, Guangzhou (CN)

(72) Inventors: Zhansheng Zhang, Guangzhou (CN); Shuanlong Pan, Guangzhou (CN)

(73) Assignee: Comba Telecom Systems (China) Ltd (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/240,620

(22) PCT Filed: Apr. 12, 2013

(86) PCT No.: PCT/CN2013/000418
§ 371 (c)(1),
(2) Date: Feb. 24, 2014

(87) PCT Pub. No.: WO2013/170622
PCT Pub. Date: Nov. 21, 2013

(65) Prior Publication Data
US 2014/0233677 A1    Aug. 21, 2014

(30) Foreign Application Priority Data

May 16, 2012   (CN) .......................... 2012 1 0152498

(51) Int. Cl.
*H04L 27/36* (2006.01)
*H04L 25/08* (2006.01)
*H04L 27/34* (2006.01)
*H04L 25/06* (2006.01)

(52) U.S. Cl.
CPC ............... *H04L 25/08* (2013.01); *H04L 25/06* (2013.01); *H04L 27/3411* (2013.01); *H04L 27/367* (2013.01)

(58) Field of Classification Search
CPC ...................... H04B 2001/0416; H04L 27/36
USPC ........................................................... 375/297
See application file for complete search history.

(56) References Cited

U.S. PATENT DOCUMENTS

| | | | |
|---|---|---|---|
| 2005/0116775 | A1 | 6/2005 | McBeath et al. |
| 2011/0260531 | A1* | 10/2011 | Obayashi et al. ............ 307/10.1 |
| 2014/0233676 | A1* | 8/2014 | Zhang et al. ................. 375/297 |

FOREIGN PATENT DOCUMENTS

| | | |
|---|---|---|
| CN | 1689295 A | 10/2005 |
| CN | 1731673 A | 2/2006 |
| CN | 101789923 A | 7/2010 |
| CN | 102143108 A | 8/2011 |

OTHER PUBLICATIONS

International Search Report for Application No. PCT/CN2013/000418 dated Jul. 18, 2013.

* cited by examiner

*Primary Examiner* — Michael Neff
(74) *Attorney, Agent, or Firm* — Lerner, David, Littenberg, Krumholz & Mentlik, LLP

(57) ABSTRACT

The present invention describes a RF signal control method and device that adjusts the first down-converter gain attenuation and uses the adjusted first down-converter gain attenuation to change the RF signal. The RF signal control method and device also uses a determined linear filter parameter to perform linearity improvement on the digital signal after the RF signal goes through a down-converter and analog-to-digital converter. The RF signal control method and device use an increased up-converter gain attenuation value to correct the RF input signal after digital pre-distortion operation, so that the adjusted and/or improved signals after power amplification have better quality than the RF signal with just a simple analog-to-digital converter and clipping equipment. Thus, the current application improves the linearity effect of digital pre-distortion operation and the dynamic effect of the power amplifier operation, thereby promoting the coverage effect of the RF output signal.

18 Claims, 7 Drawing Sheets

METHOD AND EQUIPMENT FOR CONTROLLING RADIO-FREQUENCY SIGNAL

CROSS-REFERENCE OF RELATED APPLICATIONS

The present application is a national phase entry under 35 U.S.C. §371 of International Application No. PCT/CN2013/000418 filed Apr. 12, 2013, which claims priority from Chinese Patent Application No. 201210152498.4, filed May 16, 2012, all of which are incorporated herein by reference.

FIELD OF THE INVENTION

The present invention relates to the field of power amplifier in mobile communication networks. Specifically, the present application describes a method and device for controlling Radio Frequency (RF) signals.

BACKGROUND OF THE INVENTION

The communication spectrum is becoming a more and more precious resource as a result of rapid development of global communication services. Aiming to use spectrum resources more effectively, modulation systems of high spectral efficiency, such as quadrature phase shift keying (QPSK) and quadrature amplitude modulation (QAM), have been adopted in communication systems to modulate phase and amplitude of carriers, which results in non-constant envelope modulated signals of large peak-to-average ratio (PAR). Even multi-carrier technology is being used for such non-constant envelope modulated signals. However, large PAR cannot be avoided during multicarrier synthesis, which results in poor linearity performance. Better linearity performance of transmitters leads to less interference between different equipment within the communication network and between carriers of different frequency within a single equipment. Thus, better linearity performance results in higher utilization of communication spectrum resources. As a result, there are higher demands for the linear adjustment of power amplifiers which are the core component in determining linearity performance of signals, in transmitters.

As the development of digital technologies and RF technologies grows, the solution to the linear adjustment issue of power amplifiers is to adopt digital pre-distortion technology. FIG. 1 shows a popular digital pre-distortion power amplifier system, that includes an I/Q baseband signal input port, a baseband data processor, a baseband signal clipping equipment, a baseband pre-distortion processor, a pre-distortion parameter adapter, a baseband data processor, a digital-to-analog (D/A) converter, an analog-to-digital (A/D) converter, up-converter equipment, local oscillator equipment, down-converter equipment, a power amplifier, a coupler, and an RF output port.

As shown in FIG. 1, the received I/Q baseband signals undergoes pre-distortion processing. In this regard, I/Q baseband signals are received at the I/Q baseband signal input port and processed by the baseband data processor and the baseband signal clipper equipment, which results in digital baseband signals with a lower PAR.

The digital baseband signals with a lower PAR go through the baseband pre-distortion processor, D/A converter, and up-converter equipment to become post-pre-distortion RF signals. The post-pre-distortion RF signals are then amplified through the high-power amplifier and output through the RF output port. To monitor the system linearity in real time, some RF signals are picked to go through the coupler at the RF output port. From the coupler, the RF signals go through the down-converter and A/D converter to become digital feedback baseband signal. After going through the baseband data processor and pre-distortion parameter adaptor control equipment, the signal implements the linearity adjustment on the lower-PAR digital baseband signal received by the baseband pre-distortion processor, which results in optimal linearity adjustment of the pre-distortion power amplifier system.

The digital pre-distortion system as shown in FIG. 1 can realize the linear requirements by passing the received I/Q baseband signals through the pre-distortion power amplifier system. However, the I/Q baseband signal input port used in the digital pre-distortion power amplifier system shown in FIG. 1 can only be used in certain equipment, such as base stations and remote radio units (RRU). It is impossible to use an RF port as the input port in the pre-distortion power amplifier system. This is problematic since a large proportion of the communication equipment used to provide current communication network coverage use an RF port as the signal input port. Based on the solution shown in FIG. 1, FIG. 2 illustrates a digital pre-distortion power amplifier system with an RF input port that has been developed.

The digital pre-distortion power amplifier system of FIG. 2 includes an RF signal input port, a first down-converter, a first local oscillator, a first A/D converter, a digital down-converter and filter processor, baseband signal clipping equipment, a baseband pre-distortion processor, a pre-distortion parameter adaptation controller, a baseband data processor, a D/A converter, a second A/D converter, an up-converter, a second local oscillator, a second down-converter, a power amplifier, a coupler, and an RF output port.

As shown in FIG. 2, the digital pre-distortion power amplifier system that includes an RF input port performs the same basic processing theories on received signals as the digital pre-distortion power amplifier system that is based on the I/Q baseband signal input port. The digital pre-distortion power amplifier of FIGS. 1 and 2 only differ in terms of the type of signal input port. Because of the different signal input ports, different kinds of signals are processed in the pre-distortion operation (e.g., a digital baseband signal in the case of an I/Q baseband signal input port versus an RF signal in the case of an RF input port). In comparing the two systems, the signal performance, such as signal frequency and signal quality, in the system using the digital baseband signal is superior to the system using the RF signal.

Moreover, in the pre-distortion power amplifier system shown in FIG. 2, the RF signals are processed jointly by the first down-converter and first local oscillator after being received through the RF input port, and then by the first A/D converter. If the pre-distortion power amplifier system shown in FIG. 2 is used for the pre-distortion treatment of the received RF signals, the signal linearity will be rather poor when the pre-distortion-treated signals are output through the power amplifier since the RF signals are received through the RF input port and have lower signal quality than the digital baseband signal. That may cause signals of bad quality in the coverage area and affect the normal operation of a communication network.

SUMMARY OF THE INVENTION

The present invention provides an RF signal control method and device to solve the issue of bad signal quality after performing pre-distortion on RF signals received in a pre-distortion power amplifier system.

In one embodiment, an RF signal control method includes identifying a parameter information of a current output RF signal. The parameter information is used to characterize the power of RF signal. After the parameter information is identified, the method determines an output power value corresponding to the parameter information of the current output RF signal according to the mapping relationship between the RF signal parameter information and output power value. When the absolute value of the difference between an output power value and a rated power value is above a pre-set value, increasing the up-converter gain adjustment attenuation value and decreasing the first down-converter gain adjustment attenuation value. The decreased first down-converter gain adjustment attenuation value is used to adjust the input RF signal. After performing the digital pre-distortion operation, the increased up-converter gain adjustment attenuation value is used to adjust the input RF signal, and outputting the signal through power amplifier.

Another embodiment describes an RF signal control method that includes determining a first center frequency and a bandwidth of the digital signal that is generated through the first down-conversion and A/D conversion on the input RF signal. Then, a second center frequency of the working band required by the power amplifier is determined according to the average value of the start frequency and stop frequency required by the power amplifier.

Using the difference between the first and second center frequency and the digital signal bandwidth value as the parameters for the linear filter, the method generates outputs through digital pre-distortion and power amplifier operations.

According to another embodiment, there is an RF signal control device that includes an RF power detector configured to identify a parameter information of the current output RF signal. The parameter information is used to characterize the power of the RF signal. The RF signal control device also includes a monitor controller configured to determine the output power value corresponding to the parameter information of the current output RF signal according to a mapping relationship between the RF signal parameter information and output power value. When the absolute value of the difference between an output power value and a rated power value is above a pre-set value, the device increases the up-converter gain adjustment attenuation value and decreases the first down-converter gain adjustment attenuation value. The RF signal control device also includes a first down-converter gain adjuster configured to adjust the input RF signal by using the decreased first down-converter gain adjustment attenuation value. A digital predistorter is included, as well, and is configured to use the digital pre-distortion operation on the current input RF signal after the first down-converter gain adjustment. Finally, the RF signal control device has an up-converter gain adjuster configured to adjust the input RF signal by using the increased up-converter gain adjustment attenuation value and an RF power amplifier configured to perform power amplification and output the RF signal after gain adjustment of the up-converter gain adjuster.

According to yet another embodiment, an RF signal control device includes a monitor controller configured to determine the first center frequency and bandwidth of the digital signal that is generated through the first down-conversion and A/D conversion on the input RF signal. The monitor controller then determines the second center frequency of the working band required by the power amplifier according to the average value of the start frequency and stop frequency required by the power amplifier. The RF signal control device of this embodiment also includes a linear filter configured to use the difference between the first and second center frequency and the digital signal bandwidth value as the parameters for the linear filter. Next, a digital pre-distorter is used for a digital pre-distortion operation on the digital signal after the adjustment of linear filter.

Finally, the RF signal control device includes an RF power amplifier configured to perform power amplification and output the digital signal after the pre-distortion operation.

The embodiments of the present has application have the benefit of improving linearity performance of the digital signal after the RF signal goes through the down-converter and the A/D converter by adjusting the first down-converter gain attenuation, using the adjusted first down-converter gain attenuation to change the RF signal, and/or using the determined linear filter parameter to perform linear improvement. The current embodiments also use the increased up-converter gain attenuation to correct the RF input signal after digital pre-distortion operation, so that the adjusted and/or improved signals after the power amplifier have better quality than the RF signal that with a simple A/D converter and clipping equipment. Thus, the described embodiments improve the linear effect of digital pre-distortion operation and the dynamic effect of the power amplifier operation, thereby promoting better coverage of the RF output signal.

DETAILED DESCRIPTION OF THE INVENTION

For the purpose of this invention, an RF signal control method and device are described that implement appropriate adjustments on the first down-converter gain attenuation, use the adjusted first down-converter gain attenuation to change the RF signal, and/or use the determined linear filter parameters for linearity improvement on the digital signal after the input RF signal has gone through the down-converter and A/D converter. Furthermore, the RF signal control method and device according to this embodiment implement the appropriate adjustment on the up-converter gain attenuation and use the adjusted up-converter gain attenuation to correct the RF input signal after the digital pre-distortion operation so that the adjusted/correct signals are outputted from the power amplifier.

Compared with the prior art, the current invention achieves adjustment of the RF input signal with the appropriately corrected first down-converter gain attenuation and/or linearity improvement of the RF input signal such that the resulting RF signal has better quality than one passed through a simple A/D converter and clipping operations. Thus, the current invention improves the linearity effect with a digital pre-condition treatment and the dynamic effect of the power amplifier on the RF signals, thereby enhancing the coverage of the output signals.

In conjunction with the attached figures, the embodiments of the current invention implementations are described in detail below.

Figure 1:
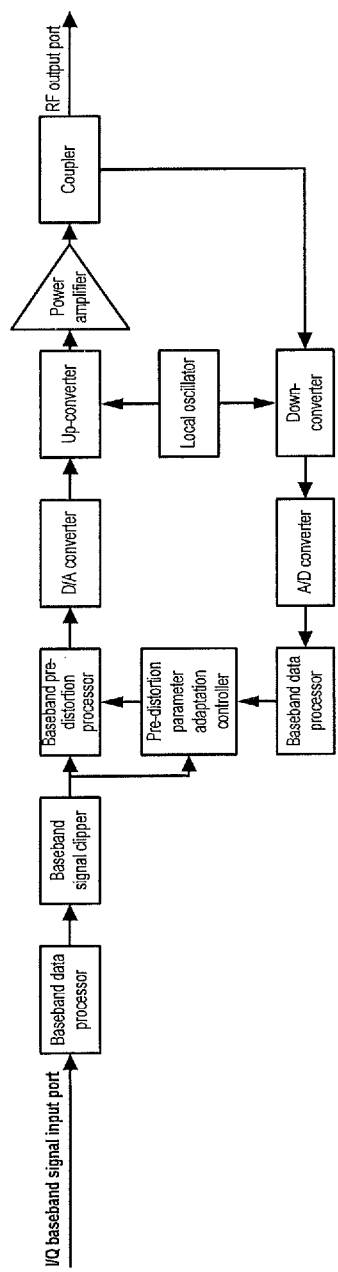
FIG. 1 is a schematic of a common digital pre-distortion power amplifier system.
Figure 2:
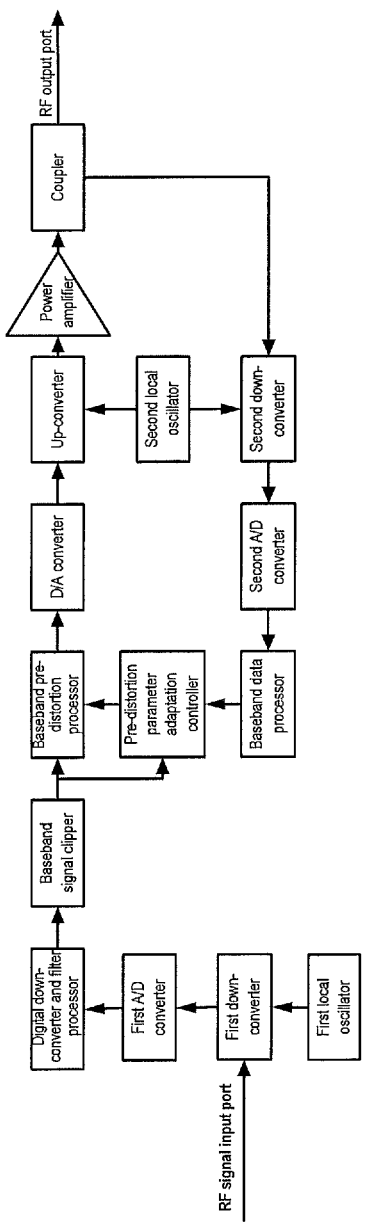
FIG. 2 is a schematic of the common digital pre-distortion power amplifier system with an RF input port.
Figure 3:
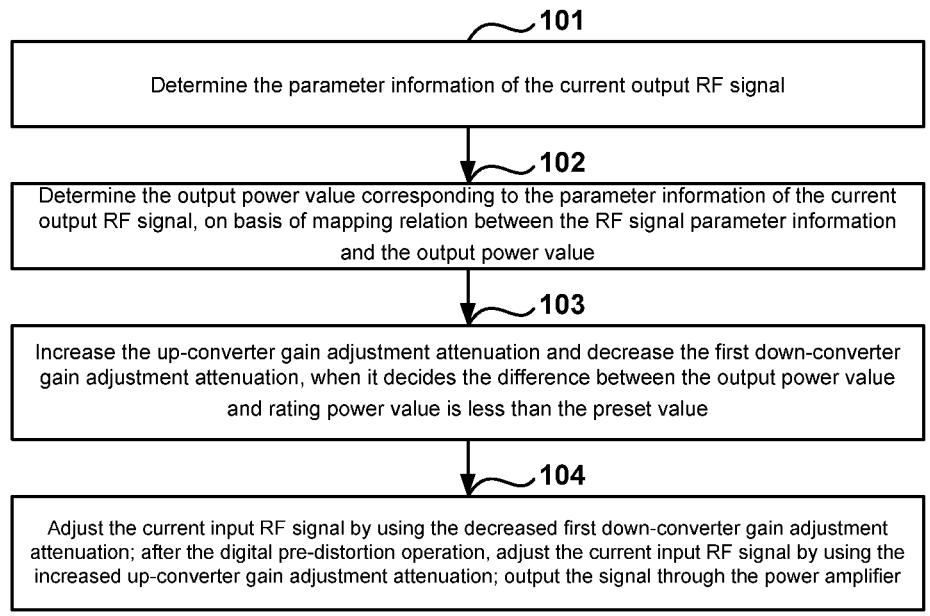
FIG. 3 is a flowchart for controlling the RF signal According to one embodiment of the present invention.

Referring to FIG. 3, a method of controlling the RF signal according to one embodiment is illustrated. The method begins at step 101, which determines the parameter information of the RF signal at the current output. In step 101, the RF signal at the current output is extracted at the RF output port via a coupler. The said parameter information is used to characterize the output power of the output RF signal and can either be the voltage or current of the output RF signal.

In this regard, the signal parameters are determined through sampling of the output RF signal and used as the basis for gain adjustment or linearity improvement on the subsequent RF input signal so that the RF output signal reaches a relatively stable status.

The extracted RF output signal is used to generate the voltage of the RF output signal through a voltage detector.

Step 102 proceeds to determine the output power value corresponding to the parameter information of the current output RF signal according to a mapping relationship between the RF signal parameter information and output power value.

In Step 102, if the power parameter information of the characterized RF signal is the voltage of the output RF signal, the mapping relationship between the voltage of the output RF signal and the output power is determined and may be stored locally in a table. If the power parameter information of the characterized RF signal is the current of the output RF signal, the mapping relationship between the current of the output RF signal and the output power is determined and may be stored locally in a table.

Once the voltage/current of the output RF signal is determined, the mapping relationship of the voltage/current and output power in the table is used to decide the corresponding output power. It is also possible to establish the linear mapping relationship between the voltage/current and output power of the output RF signal and decide the corresponding output power of the output RF signal according to the voltage/current of the RF signal on basis of the linear relationship.

The up-converter gain adjustment attenuation value is increased and the first down-converter gain adjustment attenuation value is decreased in step 103 when the absolute value of the difference between the output power value and the rated power value is above a pre-set value.

Step 103 decides whether the difference between the output power and the rating power is above the pre-set value. If the difference is above the pre-set value, the up-converter gain adjustment attenuation value is increased and the first down-converter gain adjustment attenuation value is decreased. If the difference is below the pre-set value, the current up-converter gain adjustment attenuation value and the first down-converter gain adjustment attenuation value remain unchanged.

The up-converter gain adjustment attenuation value can be incremented by either the pre-set value or determined by establishing a mapping relationship between the increment and the pre-set value. Similarly, the first down-converter gain adjustment attenuation value can be decremented by the pre-set value or determined by establishing a mapping relationship between the decrement and the pre-set value.

The pre-set value can be an empirical value or a similar value as required. Setting the pre-set value too low may cause a premature change of the up-converter gain adjustment attenuation value and first down-converter gain adjustment attenuation value, resulting in an unstable RF signal after the adjustment. If the pre-set value is set too high, this may cause no change of the up-converter gain adjustment attenuation value and first down-converter gain adjustment attenuation value, thereby resulting in no adjustment on the RF input signal. Neither case has a good outcome on the adjustment effect. As a result, an appropriate pre-set value is required, for example 6 dB.

Optimally, it is possible to adjust the second down-converter gain adjustment attenuation value in Step 103. For example, when the absolute value of the difference between the output power value and the rating power is above the pre-set value, the second down-converter gain attenuation is decreased.

Note that decrementing the second down-converter gain adjustment attenuation value can be the above mentioned pre-set value or determined by establishing the mapping relationship between the decrement and the pre-set value.

In step 104 the decreased first down-converter gain adjustment attenuation value is used to adjust the input RF signal. After the digital pre-distortion operation is performed, the increased up-converter gain adjustment attenuation value is used to adjust the input RF signal, and output the RF signal through the power amplifier.

Also in step 104, the decreased second down-converter gain adjustment attenuation value in Step 103 is used to make adjustment on the RF output signal and determine the digital pre-distortion processing parameters by using the difference between the adjusted RF signal and the RF signal adjusted with the first down-converter gain adjustment attenuation value.

Specifically, the RF signal is inputted to the RF input port and adjusted by using the decreased first down-converter gain adjustment attenuation value. After A/D conversion and baseband clipping treatment, the determined digital pre-distortion processing parameters are used for the digital pre-distortion operation on the digital signal with baseband clipping. The increased up-converter gain adjustment attenuation value is used to make adjustment on the current input RF signal, which is then outputted through the power amplifier.

According to this embodiment, the absolute value of the difference between the output power corresponding to the determined voltage of the output RF signal and the rating power is compared with the pre-set value to implement the adjustment on the first down-converter gain attenuation. The decreased first down-converter gain adjustment attenuation value is used to make an adjustment on the RF input signal. The increased up-converter gain adjustment attenuation value is used to make an adjustment on the RF input signal. The signal with the decreased second down-converter gain adjustment attenuation value is used to determine the digital pre-distortion processing parameter and to perform further adjustment on the RF input signal. This eliminates the issue of poor output signal quality with the existing technology due to the limitation of A/D conversion bits. Thus, this embodiment changes the dynamic performance of the existing digital pre-distortion power amplifier system and increases the dynamic output range.

Figure 4:
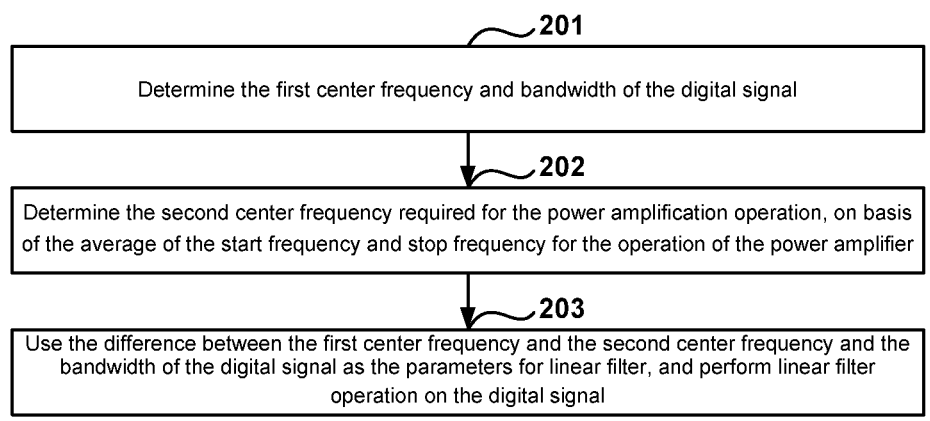
FIG. 4 is a flowchart for controlling the RF signal according to another embodiment of the present invention.

FIG. 4 shows the workflow of the RF signal control method according to another embodiment of the invention. Similar to the previously discussed embodiment, this implementation uses the decreased first down-converter gain adjustment attenuation value to make an adjustment on the current RF input signal and perform further linear filter adjustment on the RF signal before the digital pre-distortion operation.

The method begins at step 201, which determines the first center frequency and bandwidth of the digital signal.

In step 201, the digital signal is generated after the adjustment and A/D conversion by applying the first down-converter gain adjustment attenuation on the RF input signal.

Figure 5:
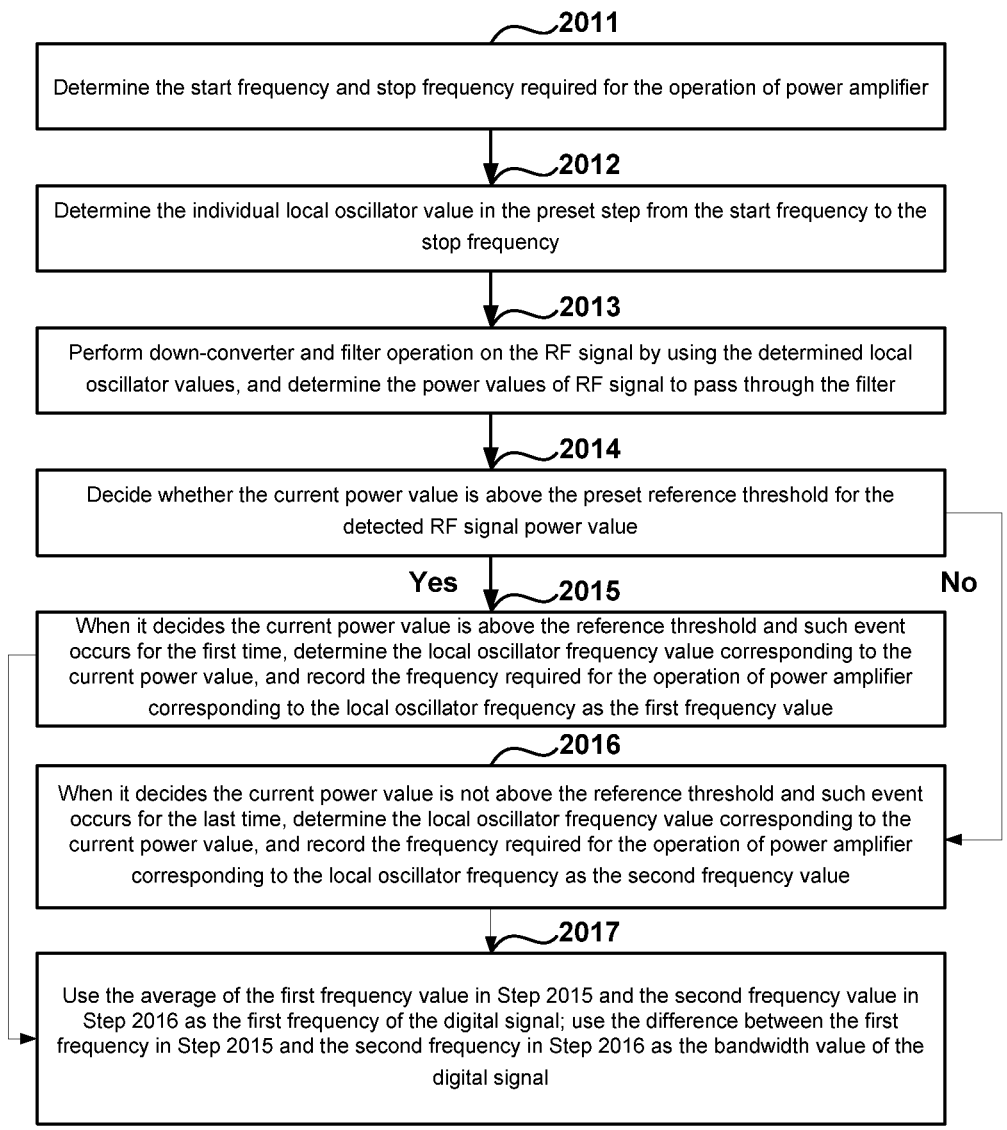
FIG. 5 is a flowchart of the method for determining the first center frequency and bandwidth of a digital signal.

FIG. 5 shows a flow chart for determining the first center frequency and bandwidth of the digital signal. Specifically, step 2011 determines the start frequency and stop frequency as required for the operation of power amplifier.

Note that the determined start frequency and stop frequency are the working frequency of the RF power amplifier in case the power amplification is implemented by a RF power amplifier.

In step 2012, different local oscillator frequencies (in steps) are determined from the start frequency to the stop frequency.

Specifically, a local oscillator frequency is mapped to each of the working frequencies determined in steps from the start frequency. The local oscillator frequency can be determined on the basis of the specific working frequency and the center frequency of the narrow-band filter.

In step 2013, the power of the RF signal to pass the filter after the down conversion and filter operations have been performed on the RF signal is determined on the basis of different local oscillator frequencies.

Additionally, step 2013, the power of the RF signal is determined. First, the determined local oscillator frequency is used for the down conversion operation on the RF input signal, turning the frequency of the RF input signal into the center frequency required by the narrow-band filter.

Next, the RF signal after down conversion passes the narrow-band filter and the power value of the RF signal is determined.

For the detected RF signal power value, step 2014 decides whether the current power is above the pre-set reference threshold. If the current power value is above the pre-set reference threshold, the method proceeds to step 2015. If the current power value is equal to or below the pre-set reference threshold, the method goes to step 2016.

Note that the pre-set reference threshold can be an empirical value or a value as required, such as 10 dB.

In step 2015, when it is determined that the current power is greater than the reference threshold and such event occurs for the first time, the local oscillator frequency corresponding to the current power value is determined, and the frequency required for the power amplifier operation corresponding to the local oscillator frequency is recorded as the first frequency.

In step 2015, the steps to determine the first frequency include:

Step a: Decide whether the current power is greater than the reference threshold. If yes, proceed with the next step; otherwise, go to step 2016.

Step b: Decide whether such event occurs for the first time. If yes, determine the local oscillator frequency corresponding to the current power, and record the frequency required for the power amplifier operation corresponding to the local oscillator frequency as the first frequency; otherwise, increase the count of such event by and record the mapping relationship between the frequency corresponding to the current power and the changed count.

Step 2016 shows how to proceed when it is decided that the current power is not greater than the reference threshold and such event occurs for the last time. The local oscillator frequency corresponding to the current power value is determined and the frequency required for the power amplifier operation corresponding to the local oscillator frequency as the second frequency is recorded.

In step 2016, the steps to determine the second frequency are as below:

Step a: Decide whether the current power is greater than the reference threshold. If yes, go to step 2015; otherwise, proceed with the next step.

Step b: Increase the count of events that the current power value is not greater than the reference threshold by 1. Record the mapping relationship between the frequency corresponding to the current power and the changed count.

Step c: Decide whether the event that the current power is not greater than the reference threshold has occurred for the last time. If yes, record the frequency required for the power amplifier operation corresponding to the current power value as the second frequency.

In step 2017, the average of the first frequency determined in step 2015 and the second frequency determined in step 2016 is used as the first center frequency of the digital signal. The difference between the first frequency determined in step 2015 and the second frequency determined in step 2016 is used as the bandwidth of the digital signal.

In step 202, the second center frequency of the working band required by the power amplifier is determined according to the average value of the start frequency and stop frequency required by the power amplifier.

Step 203 uses the difference between the first and second center frequency and the digital signal bandwidth value as the parameters to implement the linear filter on the digital signals.

According to this embodiment, the RF signal that is adjusted with the first down-converter gain adjustment attenuation value is processed in the down-converter and A/D converter. The resulting digital signal passes through a linear filter, using the determined linear filter parameters, to improve signal quality such that the RF signal output after the digital pre-distortion and power amplification operation has better coverage effect, thus enhancing the communication quality of the coverage signal.

Note that the embodiment can be used directly without previously discussed embodiments. The input RF signal is processed with the down-converter and A/D converter. The resulting digital signal passes through a linear filter using the determined linear filter parameters. The signal quality of the input RF signal can also be improved such that the output digital signal processed with the linear filter, and then passing through digital pre-distortion and power amplification operations, provides better RF signal coverage effect than existing technology, thereby enhancing signal coverage quality.

Figure 6:
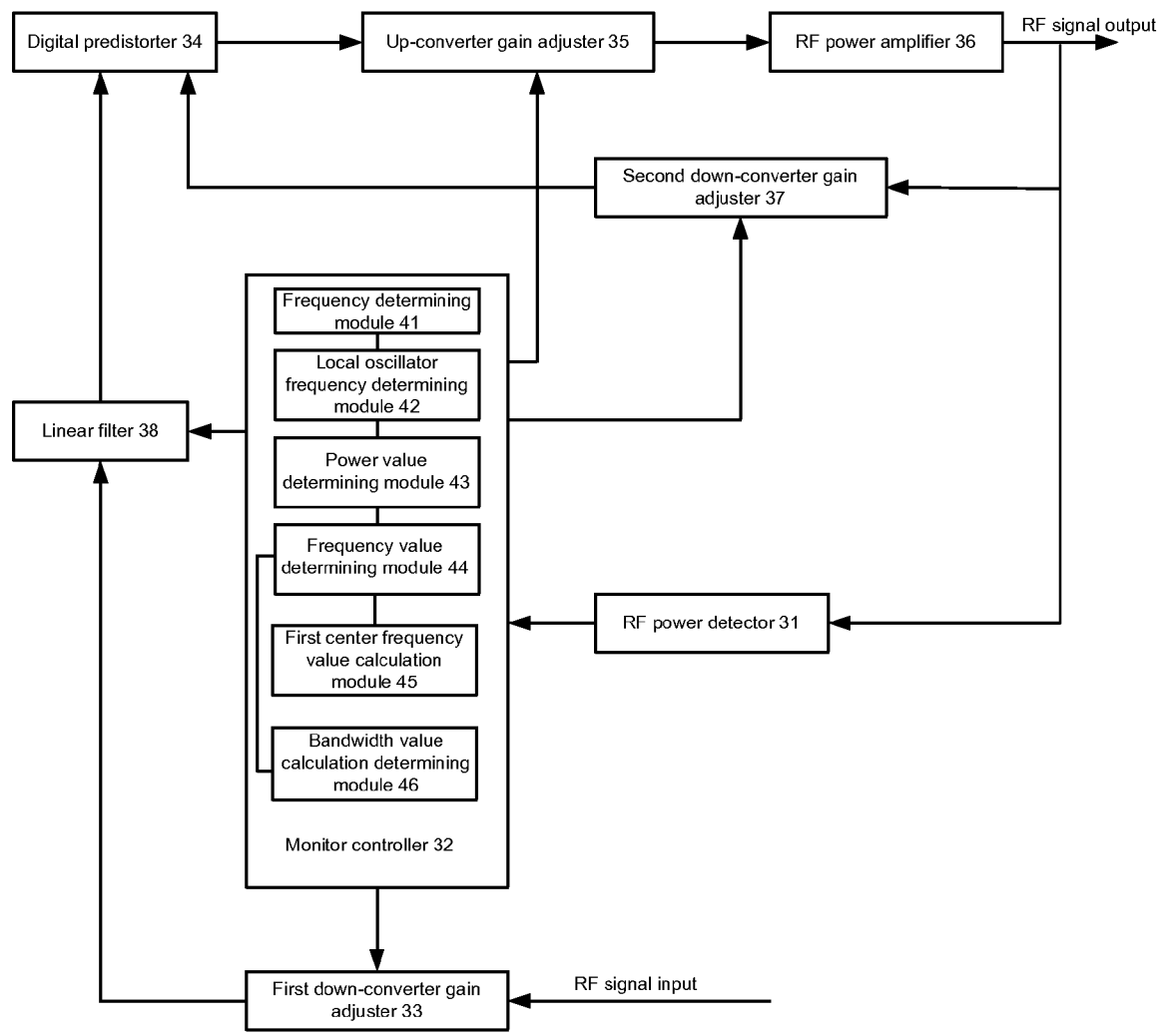
FIG. 6 is a schematic of the structure of the RF signal control device according to one embodiment of the present invention.

FIG. 6 illustrates the structure of the RF signal control device according to another embodiment. This embodiment describes a control device that is capable of performing the RF signal control method discussed in the previous embodiments. The device includes an RF power detector 31, a monitor controller 32, a first down-converter gain adjuster 33, a digital pre-distorter 34, an up-converter gain adjuster 35, and a RF power amplifier 36.

The RF power detector 31 is used for identifying the parameter information of the current output RF signal. The parameter information is used to characterize the power of RF signal.

The monitor controller 32 is used for determining the output power value corresponding to the parameter information of the current output RF signal according to a mapping relationship between the RF signal parameter information and output power value. Monitor controller 32 also increases the up-converter gain adjustment attenuation value and decreases the first down-converter gain adjustment attenuation value when the absolute value of the difference between the above output power value and rated power value is less than the pre-set value.

First down-converter gain adjuster 33 is used for adjusting the input RF signal by using the decreased first down-converter gain adjustment attenuation value.

The digital pre-distorter 34 is used for the digital pre-distortion operation on the current input RF signal after the first down-converter gain adjuster 33.

The up-converter gain adjuster 35 is used for adjusting the input RF signal by using the increased up-converter again gain adjustment attenuation value.

RF power amplifier 36 is used for power amplification and output of the RF signal after the gain adjustment of the up-converter gain adjuster 35.

Additionally, the monitor controller 32 is also used to decrease the second down-converter gain adjustment attenuation value.

The device also includes the second down-converter gain adjuster 37.

The second down-converter gain adjuster 37 uses the decreased second down-converter gain adjustment attenuation value to make an adjustment on the output RF signal and determines the digital pre-distortion processing parameters by using the difference between the RF signal after the adjustment and the RF signal after the adjustment with the first down-converter gain adjustment attenuation value.

The digital pre-distorter 34 uses the determined digital pre-distortion processing parameters to perform a pre-distortion operation on the RF signal adjusted with the first down-converter gain adjustment attenuation value.

The monitor controller 32 is also used for determining the first center frequency and bandwidth of the digital signal that is generated with the first down-converter gain adjustment attenuation value and A/D conversion of the input RF signal. The monitor controller 32 further determines the second center frequency of the working band required by the power amplifier according to the average value of the start frequency and stop frequency required by the power amplifier.

The monitor controller 32 further includes a frequency determining module 41, a local oscillator frequency determining module 42, a power determining module 43, a frequency value determining module 44, a first center frequency calculation module 45, and a bandwidth determining module 46.

The frequency determining module 41 is used to determine the start frequency and stop frequency required for the power executions.

The local oscillator frequency determining module is used to determine different local oscillator frequencies (in steps) from the start frequency to the stop frequency.

The power determining module 43 is used to determine the power of the RF signal needed to pass the filter after the second down conversion and filter operations on the RF signal on the basis of different local oscillator frequencies.

The frequency value determining module 44 is used to execute the following operations for each of the power values determined by module 43:

When it decides the current power is greater than the reference threshold and such event occurs for the first time, the local oscillator frequency corresponding to the current power value is determined and the frequency required for the power amplifier operation corresponding to the local oscillator frequency is recorded as the first frequency.

When it decides the current power is not greater than the reference threshold and such event occurs for the last time, the local oscillator frequency corresponding to the current power value is determined and the frequency required for the power amplifier operation corresponding to the local oscillator frequency is recorded as the second frequency.

The first center frequency calculation module 45 is used to calculate the average of the first and second frequency and use it as the first center frequency of the digital signal.

Bandwidth determining module 46 is used to calculate the difference between the above mentioned first and second frequencies and use it as the bandwidth of the digital signal.

The equipment also includes a linear filter 38. The linear filter 38 uses the difference between the first and second center frequency and the digital signal bandwidth value, as determined by the monitor controller 32, as the parameters to implement a linear filter on the digital signals generated from the down-converter and A/D converter.

The digital pre-distorter 34 is also used for a digital pre-distortion operation on the digital signal after the adjustment by the linear filter 38.

The RF power amplifier 36 is also used for power amplification and output of the digital signal after the digital pre-distortion operation of the digital pre-distorter 34.

Figure 7:
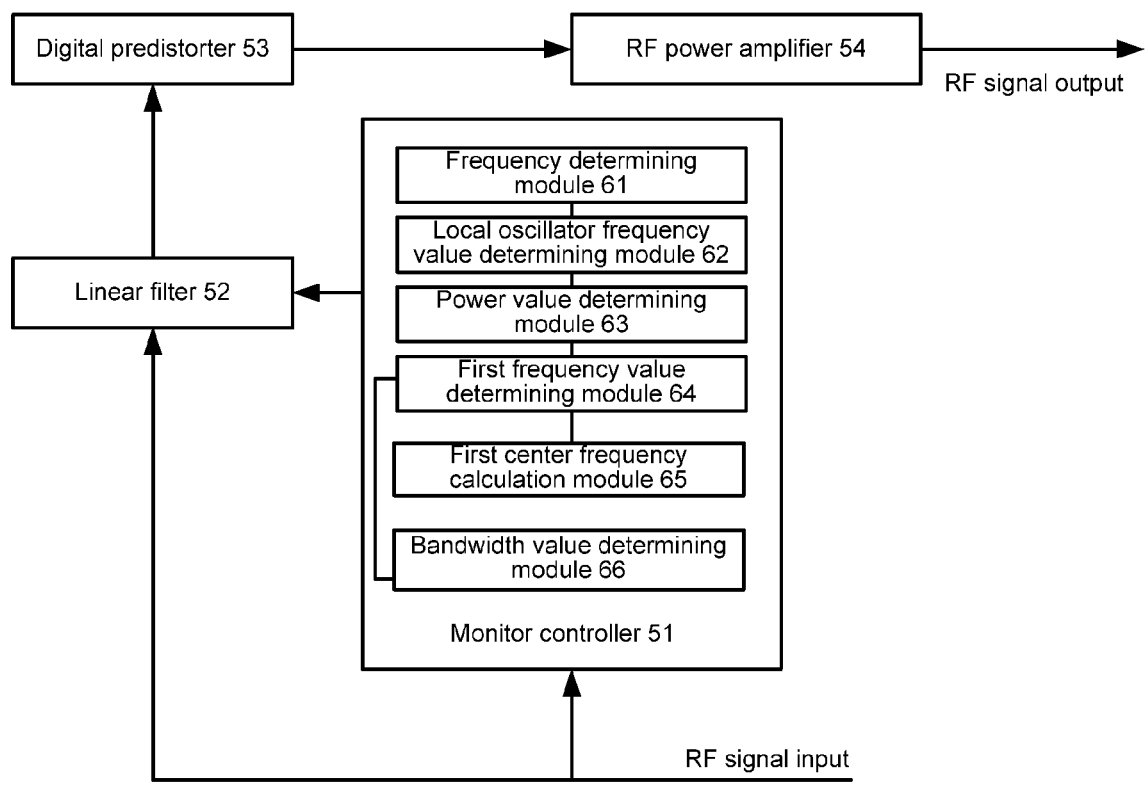
FIG. 7 is a schematic of the structure of the RF signal control device according to another embodiment of the invention.

FIG. 7 illustrates the structure of the RF signal control device according to another embodiment. This embodiment describes a control device capable of implementing the RF signal control method according to the second embodiment described above. The RF signal control device specifically includes a monitor controller 51, a linear filter 52, a digital pre-distorter 53, and a RF power amplifier 54.

The monitor controller 51 is used for determining the first center frequency and bandwidth of the digital signal that is generated through the first down-converter and A/D converter of the input RF signal. The monitor controller 51 further determines the second center frequency of the working band required by the power amplifier according to the average value of the start frequency and stop frequency required by the power amplifier.

The linear filter 52 uses the difference between the first and second center frequencies and the digital signal bandwidth value as the parameters to implement a linear filter on the digital signals.

The digital pre-distorter 53 is used for a digital pre-distortion operation on the digital signal after the adjustment by the linear filter 52.

The RF power amplifier 54 is used for power amplification and output of digital signal after the pre-distortion operation.

The monitor controller 51 further includes a frequency determining module 61, a local oscillator frequency determining module 62, a power determining module 63, a frequency value determining module 64, a first center frequency calculation module 65, and a bandwidth determining module 66.

The frequency determining module 61 is used to determine the start frequency and stop frequency required for the power executions.

The local oscillator frequency determining module 62 is used to determine different local oscillator frequencies (in steps) from the start frequency to the stop frequency.

Power determining module 63 is used to determine the power of the RF signal to pass the filter after the second down conversion and filter operations on the RF signal on basis of different local oscillator frequencies.

The frequency determining module 64 is used to execute the following operations for each of the power values determined by the power determining module 63:

When it decides the current power is greater than the reference threshold and such event occurs for the first time, the local oscillator frequency corresponding to the current power value is determined, and the frequency required for the power amplifier operation corresponding to the local oscillator frequency is recorded as the first frequency.

When it decides the current power is not greater than the reference threshold and such event occurs for the last time, the local oscillator frequency corresponding to the current power value is determined and the frequency required for the power amplifier operation corresponding to the local oscillator frequency is recorded as the second frequency.

The first center frequency calculation module 65 is used to calculate the average of the above mentioned first and second frequencies and use it as the first center frequency of the digital signal.

Bandwidth determining module 66 is used to calculate the difference between the above mentioned first and second frequencies and use it as the bandwidth of the digital signal.

Figure 8:
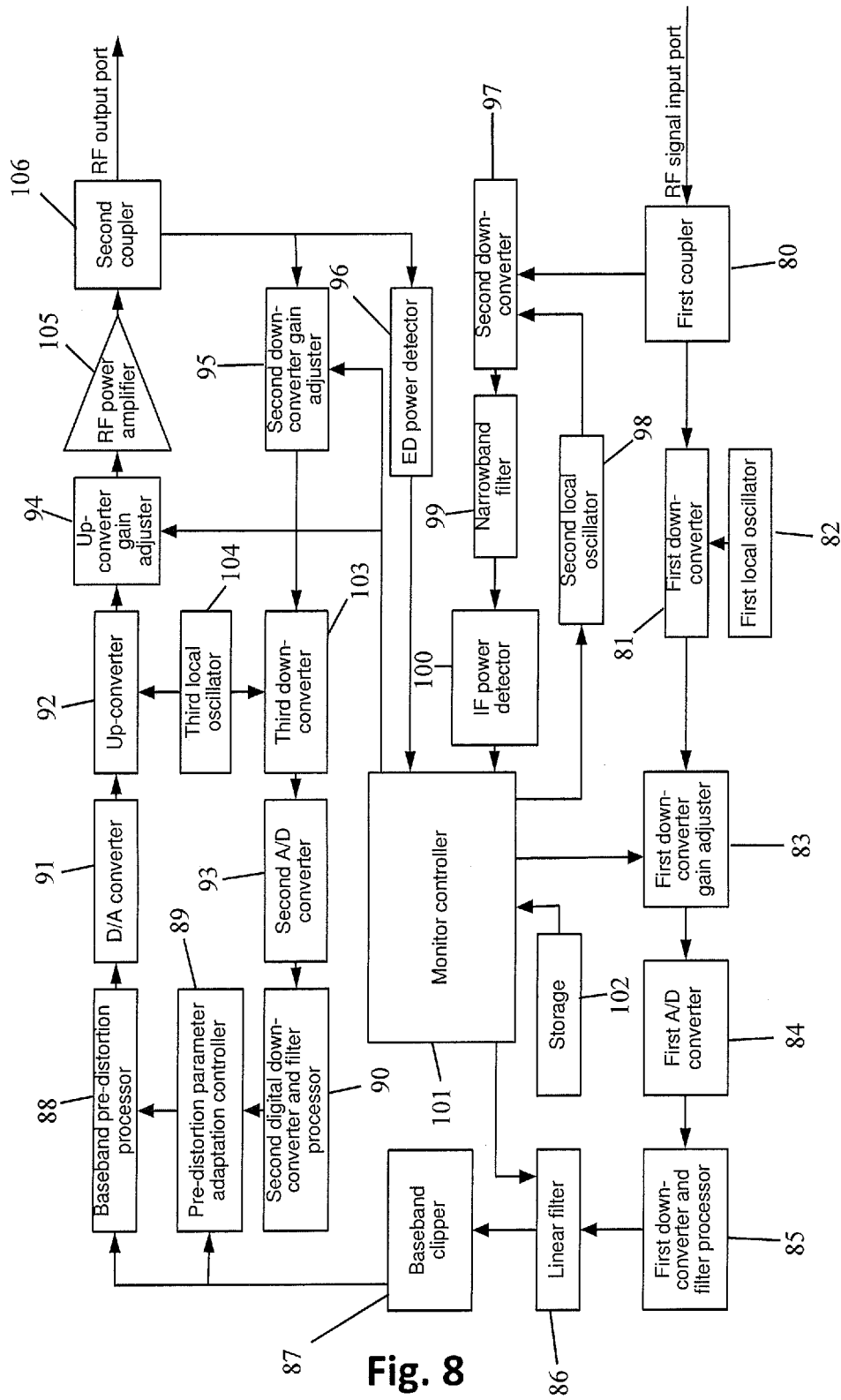
FIG. 8 is a schematic of the structure of the RF signal control system according to a different embodiment of the present invention.

FIG. 8 illustrates the structure of the RF signal control system according to another embodiment of the invention. The system includes the first coupler 80, a first down-converter 81, a first local oscillator 82, a first down-converter gain adjuster 83, a first A/D converter 84, a first digital down-conversion & filter processor 85, a linear filter 86, a baseband clipping processor 87, a baseband pre-distortion processor 88, a pre-distortion parameter adaptation controller 89, a second digital down-converter and filter processor 90, a D/A converter 91, an up-converter 92, a second A/D converter 93, an up-converter gain adjuster 94, a second down-converter gain adjuster 95, an RF power detector 96, a second down-converter 97, a second local oscillator 98, a narrow-band filter 99, an intermediate power detector 100, a monitor controller 101, a storage device 102, a third down-converter 103, a third local oscillator 104, a RF power amplifier 105, and a second coupler 106.

The working principles of the system is described as below:

Step 1: The RF power detector gets an RF output signal via the second coupler and determines the voltage of the RF output signal. The monitor controller uses the determined voltage to determine the first gain adjustment attenuation value by using the method of previously discussed embodiments, and sends it to the first down-converter gain adjuster.

Step 2: The RF input signal goes through the first coupler, and becomes an intermediate frequency (IF) signal after the common operation of the first down-converter and the first oscillator. The IF signal enters into the first down-converter gain adjuster, which decreases the signal by a gain adjustment attenuation value and turns it into an IF signal that is fit for the subsequent processing.

Step 3: The IF signal passes through the first A/D converter. The sampling rate is determined according to the bandpass sampling theorem and the frequency of the IF signal. The resulting IF digital baseband signal passes through the first digital down-converter and filter processor. By operation of digital down-conversion and image filter, the IF signal then turns into a zero intermediate frequency (ZIF) digital baseband signal.

Here, the first A/D converter is implemented with special ADC component, and the first down-converter and digital filter can be implemented with a Field Programmable Gate Array (FPGA).

Step 4: The monitor controller first determines linear filter parameters according to the embodiment discussed above with respect to the ZIF digital baseband signal, and sends the linear filter parameters to the linear filter.

The linear filter then performs a linear filter improvement on the received ZIF digital baseband signal according to the determined linear filter parameters, which results in the digital baseband signal.

Optimally, when the monitor controller determines the linear filter parameters according to the ZIF baseband signal by the embodiment described above, it is possible to acquire the RF input signal via the first coupler. Through the common operation of the second down-converter and second local oscillator, a constant IF signal is outputted. The IF signal enters into the narrow-band filter, and, with the out-of-band signal filtered out, becomes the signal that passes through the narrow band filter. The monitor controller detects the power value of the IF signal passing through the IF power detector.

Step 5: The digital baseband signal after linearity improvement enters into the baseband clipping equipment for baseband clipping operation. With PAR lowered, the resulting signal is sent to the baseband pre-distortion processor.

Note that the baseband clipping processor initially implements pre-processing on the digital baseband signal.

Step 6: After the baseband clipping operation, the signal enters into the digital pre-distorter and implements correction on the digital signal by using the digital pre-distortion parameters.

Here, the digital pre-distorter can be a special chip or implemented with at least one FPGA.

Step 7: After the digital pre-distortion operation, the signal passes through the D/A converter and becomes an analog IF signal, which then turns into an RF signal through the up-converter and the third local oscillator.

Step 8: The monitor controller also increases the up-converter gain adjustment attenuation value in Step 1. The RF signal enters into the up-converter gain adjuster and turns into an RF signal that is suitable for subsequent operations through a gain adjustment realized by using the increased up-converter gain adjustment attenuation value.

Step 9: Through the RF power amplifier, the above mentioned RF signal will have the rated output power and be outputted via the second coupler.

After the RF signal is outputted, the second coupler extracts the RF output signal as a feedback signal. Through the second down-converter gain adjuster, the RF output signal is adjusted by using the second down-converter gain adjustment attenuation value and becomes a signal suitable for subsequent processing. An IF signal is output after the common operation of the third down-converter and the third local oscillator.

The pre-distortion parameter adaptation controller processes the IF digital baseband signal through down conversion and filter operations and produces a ZIF digital baseband signal. The signal subtracts the signal resulting from the baseband clipping operation in step 5, and the difference is used as the digital pre-distortion adjustment parameter.

Although the invention herein has been described with reference to particular embodiment, it is to be understood that these embodiments are merely illustrative of the principles and applications of the present invention. It is therefore to be understood that numerous modification may be made to the illustrative embodiments and that other arrangements may be devised without departing from the spirit and scope of the present invention as defined by the appended claims.

The invention claimed is:

1. A radio frequency (RF) signal control method comprising:
   identifying a parameter information of a current output RF signal, wherein said parameter information is used to characterize the power of the current output RF signal;

determining an output power value corresponding to the parameter information of the current output RF signal according to a mapping relationship between the current output RF signal parameter information and the output power value;
increasing an up-converter gain adjustment attenuation value and decreasing a first down-converter gain adjustment attenuation value when an absolute value of a difference between the output power value and a rated power value is above a pre-set value;
using the decreased first down-converter gain adjustment attenuation value to adjust a current input RF signal;
after a digital pre-distortion operation, using the increased up-converter gain adjustment attenuation value to adjust the current input RF signal and outputting an output RF signal through a power amplifier.

2. The method according to claim 1, wherein after the absolute value difference between the determined output power value and the rated power value has been decided as being greater than the pre-set value and before the adjustment is done on the current RF input signal using the decreased first down-converter gain adjustment attenuation value, the method further comprises:
decreasing a second down-converter gain adjustment attenuation value;
using the decreased second down-converter gain adjustment attenuation value to make an adjustment on the current output RF signal, and
determining at least one digital pre-distortion processing parameter according to the difference between the adjusted current output RF signal and the current input RF signal adjusted with the first down-converter gain adjustment attenuation value.

3. The method according to claim 2, wherein after the adjustment is done on the current input RF signal using the decreased first down-converter gain adjustment attenuation value and before the digital pre-distortion operation, the method further comprises:
determining a first center frequency and a bandwidth of a digital signal that is generated by adjusting the current input RF signal with the first down-converter gain adjustment attenuation value and passing the current input RF signal through an analog-to-digital (A/D) converter;
determining a second center frequency of a working band required by the power amplifier according to an average value of a start frequency and a stop frequency required by the power amplifier.

4. The method according to claim 3 wherein determining the first center frequency and bandwidth of the digital signal further comprises:
determining the start frequency and stop frequency as required for the operation of the power amplifier;
determining different local oscillator frequencies in steps from the start frequency to the stop frequency;
determining a power value of an intermediate RF signal to pass through the linear filter after the down conversion and filter operations have been performed on the current input RF signal based on different local oscillator frequencies.

5. The method according to claim 2, wherein the digital pre-distortion operation, further comprises:
using at least one of the determined digital pre-distortion processing parameters to perform a digital pre-distortion operation on the current input RF signal adjusted with the first down-converter gain adjustment attenuation value.

6. The method according to claim 3, wherein after the current input RF signal is adjusted by using the decreased first down-converter gain adjustment attenuation value and before the digital pre-distortion operation, the method further comprises:
using a difference between the first and second center frequencies and the bandwidth of the digital signal as parameters to implement a linear filter on the digital signal.

7. The method according to claim 4, wherein determining the power value of the intermediate RF signal further comprises:
if a current power value is greater than a reference threshold and such event occurs for the first time, then a local oscillator frequency corresponding to the current power value is determined and a frequency required for the operation of the power amplifier corresponding to the local oscillator frequency is recorded as a first frequency;
if the current power value is not greater than the reference threshold and such event occurs for the last time, then the local oscillator frequency corresponding to the current power value is determined and the frequency required for the operation of the power amplifier corresponding to the local oscillator frequency is recorded as a second frequency;
wherein an average of the first and second frequencies is used as the first center frequency of the digital signal and the difference between the first and second frequencies is used as the bandwidth of the digital signal.

8. A radio frequency (RF) signal control method, comprising:
determining a first center frequency and a bandwidth of a digital signal that is generated by passing an input RF signal through a first down-converter and an analog-to-digital (A/D) converter;
determining a second center frequency of a working band required by a power amplifier according to an average value of a start frequency and a stop frequency required by the power amplifier;
using a difference between the first and second center frequencies and the bandwidth of the digital signal as parameters for performing a linear filter on the digital signal, and
generating an output RF signal by applying digital pre-distortion and power amplifier operations on the digital signal.

9. The method according to claim 8, wherein determining the first center frequency and the bandwidth of the digital signal further comprises:
determining the start frequency and stop frequency as required for the operation of power amplifier;
determining different local oscillator frequencies in pre-set steps from the start frequency to the stop frequency; and
determining a power value required for the digital signal to pass through a filter after the digital signal has passed through a second down conversion and filter operations based on the different local oscillator frequencies.

10. The method according to claim 9, wherein determining the power value of the digital signal further comprises:
if a current power is greater than a reference threshold and such event occurs for the first time, then a local oscillator frequency corresponding to the current power value is determined and a frequency required for the operation of the power amplifier corresponding to the local oscillator frequency is recorded as a first frequency;

if the current power is not greater than the reference threshold and such event occurs for the last time, then the local oscillator frequency corresponding to the current power value is determined and the frequency required for the operation of the power amplifier corresponding to the local oscillator frequency is recorded as a second frequency;

wherein an average of the first and second frequencies is used as the first center frequency of the digital signal and the difference between the first and second frequencies is used as the bandwidth of the digital signal.

11. A radio frequency (RF) signal control device, comprising:

an RF power detector configured to identify a parameter information of a current output RF signal, wherein said parameter information is used to characterize the power of the current output RF signal, a monitor controller configured to determine an output power value corresponding to the parameter information of the current output RF signal according to a mapping relationship between the RF signal parameter information and output power value, wherein the monitor controller is further configured to increase an up-converter gain adjustment attenuation value and to decrease a first down-converter gain adjustment attenuation value when an absolute value of a difference between the output power value and a rated power value is above a pre-set value, a first down-converter gain adjuster configured to adjust an input RF signal by using the decreased first down-converter gain adjustment attenuation value, a digital pre-distorter configured to use a digital pre-distortion operation on the input RF signal after the adjustment performed by the first down-converter gain adjuster, an up-converter gain adjuster configured to adjust the input RF signal by using the increased up-converter gain adjustment attenuation value; and an RF power amplifier configured to use power amplification and to output an output RF signal after the gain adjustment of the up-converter gain adjuster.

12. The RF signal control device according to claim 11 wherein the monitor controller is further configured to decrease a second down-converter gain adjustment attenuation value, and the RF signal control device further comprises:

a second down-converter gain adjuster is configured to use the decreased second down-converter gain adjustment attenuation value to make an adjustment on the output RF signal and to determine at least one digital pre-distortion processing parameter according to the difference between the output RF signal after the adjustment and the current input RF signal after the adjustment with the first down-converter gain adjustment attenuation value, a digital pre-distorter configured to use at least one pre-determined digital pre-distortion processing parameter to perform a pre-distortion operation on the current input RF signal adjusted with the first down-converter gain adjustment attenuation value.

13. The RF signal control device according to claim 12 wherein the monitor controller is further configured to determine a first center frequency and a bandwidth of a digital signal that is generated with the first down-converter gain adjustment attenuation value and passing the current input RF signal through an analog-to-digital (A/D) converter and to determine a second center frequency of a working band required by the power amplifier according to an average value of a start frequency and a stop frequency required by the power amplifier.

14. The RF signal control device according to claim 13, wherein the device further comprises:

a linear filter configured to use a difference between the first and second center frequencies and the bandwidth of the digital signal as parameters to implement a linear filter on the digital signal.

15. A radio frequency (RF) signal control device, comprising:

a monitor controller configured to determine a first center frequency and a bandwidth of a digital signal that is generated by passing an input RF signal through a first down-converter and an analog-to-digital (A/D) converter and to determine a second center frequency of a working band required by a power amplifier according to an average value of a start frequency and a stop frequency required by the power amplifier, a linear filter configured to use a difference between the first and second center frequencies and the bandwidth of the digital signal as parameters to implement the linear filter on the digital signal, a digital pre-distorter configured to use a digital pre-distortion operation on the digital signal after an adjustment by the linear filter, and an RF power amplifier configured to use power amplification and to output the digital signal after the digital pre-distortion operation.

16. The RF signal control device according to claim 15, wherein the monitor controller further comprises:

a frequency determining module configured to determine the start frequency and stop frequency required for the power amplification, a local oscillator frequency determining module configured to determine different local oscillator frequencies in pre-set steps from the start frequency to the stop frequency, a power determining module configured to determine a power value required for the digital signal to pass through a filter after the digital signal has passed through a second down conversion and filter operations based on the different local oscillator frequencies.

17. The RF control device according to claim 16, wherein the frequency determining module comprises instructions, that when executed by a processor, perform the steps of:

if a current power is greater than a reference threshold and such event occurs for the first time, then a local oscillator frequency corresponding to the current power value is determined and a frequency required for the operation of the RF power amplifier corresponding to the local oscillator frequency is recorded as a first frequency;

if the current power is not greater than the reference threshold and such event occurs for the last time, then the local oscillator frequency corresponding to the current power value is determined and the frequency required for the operation of the RF power amplifier corresponding to the local oscillator frequency is recorded as a second frequency.

18. The RF control device according to claim 17, wherein the monitor controller further comprises:

a first center frequency calculation module configured to calculate an average of the first and second frequencies and use the average as the first center frequency of the digital signal;

a bandwidth determining module configured to calculate the difference between the first and second frequencies and use it as the bandwidth of the digital signal.

\* \* \* \* \*